(12) United States Patent
Zhang et al.

(10) Patent No.: US 7,983,340 B2
(45) Date of Patent: *Jul. 19, 2011

(54) EXTRACTING KEY FRAMES FROM VIDEO USING A TRIANGLE MODEL OF MOTION BASED ON PERCEIVED MOTION ENERGY

(75) Inventors: HongJiang Zhang, Beijing (CN); Tianming Liu, Upper Darby, PA (US)

(73) Assignee: Microsoft Corporation, Redmond, WA (US)

( * ) Notice: Subject to any disclaimer, the term of this patent is extended or adjusted under 35 U.S.C. 154(b) by 1500 days.

This patent is subject to a terminal disclaimer.

(21) Appl. No.: 11/279,245

(22) Filed: Apr. 10, 2006

(65) Prior Publication Data

US 2006/0165382 A1 Jul. 27, 2006

Related U.S. Application Data

(63) Continuation of application No. 10/346,160, filed on Jan. 15, 2003, now Pat. No. 7,027,513.

(51) Int. Cl.
*H04B 1/66* (2006.01)
*H04N 7/12* (2006.01)
*H04N 11/02* (2006.01)
*H04N 11/04* (2006.01)

(52) U.S. Cl. .......... 375/240.16; 375/240.01; 375/240.12

(58) Field of Classification Search .............. 375/240.16
See application file for complete search history.

(56) References Cited

U.S. PATENT DOCUMENTS

| 5,635,982 A * | 6/1997 | Zhang et al. ............ 348/231.99 |
| 6,816,632 B1 * | 11/2004 | Slice ............................. 382/294 |
| 7,027,513 B2 * | 4/2006 | Zhang et al. ............ 375/240.16 |
| 2004/0004585 A1 * | 1/2004 | Brown et al. .................. 345/32 |
| 2005/0213656 A1 * | 9/2005 | Liu et al. ................. 375/240.01 |

* cited by examiner

*Primary Examiner* — Dac Ha
*Assistant Examiner* — Erin File
(74) *Attorney, Agent, or Firm* — Lyon & Harr, L.L.P.; Craig S. Fischer

(57) ABSTRACT

A key frame extraction system and method for extracting key frames from a video based on motion analysis of frames within the video. Key frames are highlight frames that are effective in summarizing a video sequence. This allows a user to quickly find a desired spot in a video is long and contains differing subject matter. The key frame extraction system and method uses a triangle model of the motion energy in each frame and extracts key frames based on this model. More specifically, motion analysis is performed on the video frames in order to identify motion acceleration and motion deceleration points within the frames. A triangle model of motion then is constructed based on results of the motion analysis. The apex of the triangle represents a turning point between motion acceleration and motion deceleration. Frames corresponding to this apex are selected as key frames.

15 Claims, 15 Drawing Sheets

EXTRACTING KEY FRAMES FROM VIDEO USING A TRIANGLE MODEL OF MOTION BASED ON PERCEIVED MOTION ENERGY

CROSS REFERENCE TO RELATED APPLICATIONS

This application is a continuation application of U.S. patent application Ser. No. 10/346,160, entitled "Method and System for Extracting Key Frames From Video Using a Triangle Model of Motion Based on Perceived Motion Energy," filed Jan. 15, 2003, which is now allowed, the entire contents of which are hereby incorporated by reference.

BACKGROUND

Video photography is becoming increasingly more popular among users as the cost of digital video cameras continues to drop. A user typically will use their digital video camera to capture memorable moments, such as, for example, a wedding or a vacation. Although digital video cameras are quite popular, analog video cameras can also be used to make videos that can be processed using digital image processing techniques. This involves a conversion from analog videos into a digital medium for processings Video generally contains a great deal of data. Much of this data, however, in terms of content, is redundant. Redundancy occurs because video uses a high frame rate (30 frames/second) to please the human eye. The human brain, however, can capture the same content with a much lower frame rate.

It is often desirable for a user to be able to quickly locate a specific section of video. By way of example, a video may contain portions of a vacation and a wedding. For the wedding sequence, the user may want to find the section of the video where the cake is being cut. Manually searching and analyzing the entire video can be tedious for the user because even short videos typically contain a high number of frames. Thus, if the user wanted to locate the wedding cake sequence or shot from an hour-long video, this would require analyzing and viewing over 100,000 frames.

In order to ease the task of locating a desired video shot or sequence (or simply, a video sequence), key frames can be used. Key frames are quite useful in aiding a user in identifying desired portions of a video. In general, key frames are selected frames of the video that are representative of the content of a video sequence. Key frames are the video equivalent of an index of a book. While the book index contains keywords referenced by a page number, video key frames are frames of the video that are representative of the material contained on the video. If a reader of the book desires to find information contained in the book about a particular subject or term, the user looks in the index. Similarly, user can find a particular subject contained in the video by searching the key frames of the video.

One problem current key frame selection techniques is that there is no agreement on how to choose the "best" key frame for a video sequence. By "best", it is meant the frame contained in the video sequence that is most representative of the video content of the video sequence. This is because selecting the "best" key frame is subjective. Some techniques select the middle frame of a video sequence, others select the first frame, while still others select the last frame. Another problem with current key frame selection techniques is that there is no agreement on the number of key frames that should be used to represent the video content of a video sequence.

Many of the existing key frame selection techniques use a threshold approach. In general, the threshold approach states that if a property (such as motion) of a frame within a video sequence is above a certain threshold amount, then the frame is considered as a key frame. One problem with the threshold approach is that the threshold must be constantly adjusted and fine tuned based on variables such as video content, camera types, and camera compression. For instance, one portion of a video may contain content that includes a sleeping baby, while another portion may contain high-action content such as a soccer game. Although a threshold can be fine-tuned for a specific type of video content, when another type of video content is being analyzed the threshold must be fine-tuned afresh. This requires tedious and time-consuming threshold fine tuning. Therefore, there exist a need for a keyframe extraction technique that provides a more uniform and robust approach to the selection of video key frames.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The invention disclosed herein includes a method and system for extracting key frames from a video based on motion analysis of frames within the video. More specifically, motion analysis is performed on the video frames in order to identify motion acceleration and motion deceleration points within the frames. A triangle model of motion then is constructed based on results of the motion analysis. The apex of the triangle represents a turning point between motion acceleration and motion deceleration. Frames corresponding to this apex are selected as key frames. Research indicates that frames corresponding to the apex are indicative of the frames a user would most prefer to see in an edited video.

The general idea behind applying a triangle model to a motion analysis representation of the video sequence is that triangles are good indicators of wherein the video sequence content changes. Triangles show the trend of motion as well as an energy accumulation process. Typically, energy is accumulated to the peak or apex of the triangle and then the energy starts to reduce. Thus, if there is a dramatic change in the triangle (such as a sharp, pointed triangle), it can be seen that the apex of the triangle is a good candidate for a representative key frame. This is because the apex of the triangle represents the frame capturing the moment of change. In general, the frame at the apex of the triangle has captured the moment of change of motion (from acceleration to deceleration), and consequently should be a "better" key frame than those frames during the change. By "better" it is meant that the frame is more representative of the video content in that video sequence. In addition, the number of key frames used to represent the video content can be determined by the number of triangles. Thus, the key frame extraction system and method provides a uniform and consistent approach to determining which frame to select as a key frame and how many key frames to select.

In general, the key frame extraction system and method uses a triangle model of motion energy in each frame of a video sequence and extracts one or more key frames based on this model. More specifically, the key frame extraction system includes a motion analysis module, a triangle model generator, and a key frame selection module. The motion analysis module computes motion variation patterns of the video sequence. In one embodiment, the motion variation patterns are used to generate a perceived motion energy representation of the video sequence. The triangle model generator segments the video sequence into a plurality of sub-segments based on the motion variation patterns. In one embodiment, the sub-segments are triangles. The key frame selection module selects one or more key frames based on the sub-segments.

The motion analysis module includes a motion vector extractor, an average magnitude calculator, a dominant motion direction percentage calculator a perceive motion energy calculator, and a perceived motion energy representation module. The motion vector extractor extracts motion vectors from a frame of the video sequence. The average magnitude calculator computes the average magnitude of the motion vectors with the frame, while the dominant motion direction percentage calculator computes the spatial motion consistency within the frame. The perceived motion energy calculator computes the perceived motion energy of the video sequence, and the perceive motion energy representation module generates a perceive motion energy representation of the video sequence.

The triangle model generator includes a splitting boundaries search module, an initial triangle modeling module, a triangle size adjustment module, and a slope adjustment module. The splitting boundaries search module search the perceived motion energy representation for splitting boundaries. In one embodiment, these splitting boundaries are at local minimums of the perceived motion energy representation. The initial triangle modeling module performs a search of the perceived motion energy representation to detect and apply initial triangle patterns to the perceived motion energy representation. Adjustment of the initial triangles is made using the triangle size adjustment module, which adjusts, if needed, the size of a triangle, and the slope adjustment module, which examines slopes of sides of the triangles to determine whether triangles should be divided or combined. Based on these adjustments to the initial triangle model, a revised triangle model is generated.

The key frame selection module includes a triangle model analyzer, a selection rules application module, and a key frame extractor. The triangle model analyzer notes the location of each triangle within the revised triangle model. The selection rules application module applies rules of selection that dictate where on a triangle to select a key frame. The selection rules include selection a key frame at an apex of a triangle, at a vertex (or valley) of a triangle, or both. The key frame extractor extracts key frames from the video sequence based on these selection rules.

The key frame extraction method uses the key frame extraction system to select and extract key frames from a video sequence. The selection of key frames is based on an examination of motion variation within each video frame. Motion analysis is performed on each video frame to pinpoint motion variation patterns that include motion acceleration and deceleration points within the video sequence. Based on these motion variation patterns, a triangle model of motion is applied to the motion analysis representation. Based on selection rules, frames from the triangle model are extracted to serve as key frames.

The key frame extraction method includes computing a motion variation representation of the video, detecting triangles in the motion variation representation, and extracting key frames from the video based on the detected triangles. In one embodiment, the motion variation representation is a perceived motion energy representation of the video sequence. This includes extracting motion vectors from the video sequence to compute the perceived motion energy representation. From these motion vectors, an average magnitude and percentage of dominant motion direction are computed. These values then are used to compute the perceived motion energy representation. In addition, the perceived motion energy representation is segmented based on motion patterns within the perceived motion energy representation, and one or more key frames are selected from the video sequence based on the segmentation. The segmentation includes an applying an initial triangle model to the motion variation representation.

In addition, the method includes adjusting the initial triangle module. These adjustments can be based on triangle size and the slope of the sides of a triangle. Size adjustment includes determining splitting boundaries using the perceived motion energy model and adjusting a size of the triangles based on the splitting boundaries to form revised triangles. Based on these revised triangles, key frames are extracted from the video sequence.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the key frame extraction system and method, reference is made to the accompanying drawings, which form a part thereof, and in which is shown by way of illustration a specific example whereby the key frame extraction system and method may be practiced. It is to be understood that other embodiments may be utilized and structural changes may be made without departing from the scope of the claimed subject matter.

I. General Overview

Key frames are highlight frames that are effective in summarizing a video sequence. This allows a user to quickly find a desired segment in a video that may be quite long and contain widely differing subject matter. Currently, key frame selection techniques exist that use various algorithms to select one or more frames from a video sequence to serve as key frames. The intent of these key frames is to represent the content contained in the video sequence. Problems, however, with current key frame selection techniques include lack of uniformity in selecting the most representative key frames and in choosing the number of key frames.

The invention disclosed herein includes a key frame selection process and system that provides uniform and consistent selection of key frames over a wide range of video subject matter or content. The invention uses a triangle model of the motion energy in each frames within the video sequence and extracts one or more key frames based this model. Key frames selection in uniform, because key frames are selected at the points of the model where the motion turns from acceleration to deceleration and vice versa. This selection technique provides a uniform and consistent selection method that yields a proper number of key frames that are most representative of the content of the video sequence.

Figure 1:
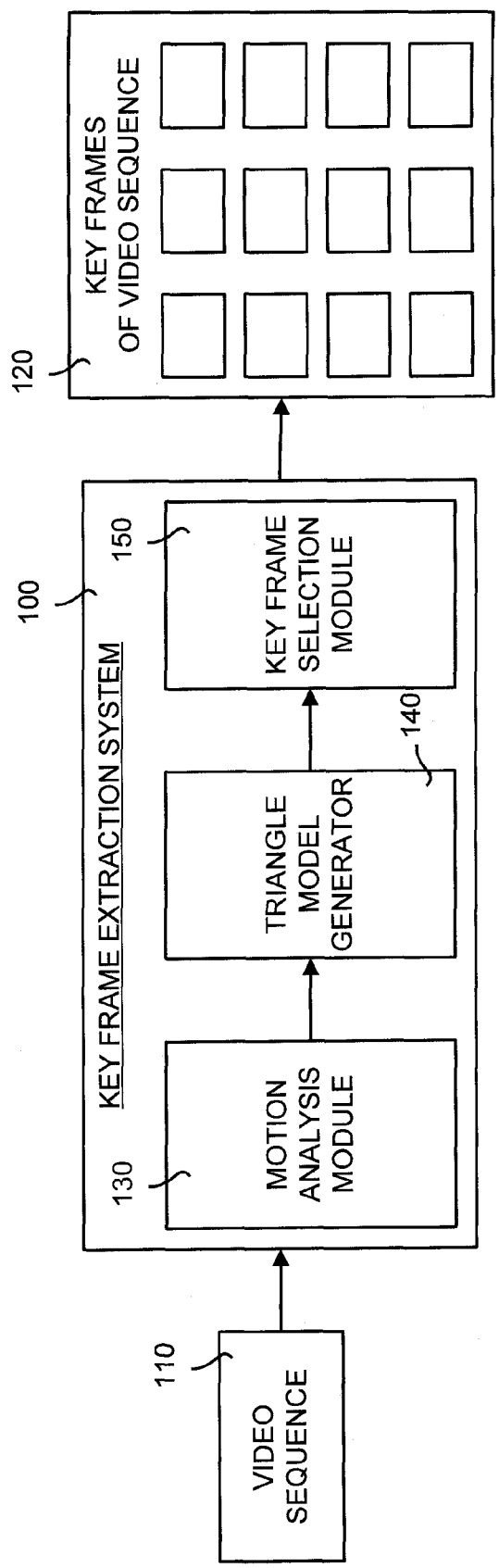
FIG. 1 is a block diagram illustrating a general overview of the key frame extraction system disclosed herein.

FIG. 1 is a block diagram illustrating a general overview of the key frame extraction system 100 disclosed herein. In general, the system 100 processes an input video sequence 110 and outputs one or more key frames 120 that are representative of the content of the video sequence 110. The number of key frames typically is much less than the total number of frames in the video sequence. The key frames 120 allow a user to quickly and easily find desired subject matter.

As shown in FIG. 1, the key frame extraction system 100 includes a motion analysis module 130, a triangle model generator 140, and a key frame selection module 150. The motion analysis module 130 computes motion variation patterns to measure the visual content complexity of a video sequence. These motion variation patterns are usually composed of a motion acceleration process followed by a deceleration process. Such a motion variation pattern usually reflects an action in events. For example, sports events typically follow break-play-break sequences while news video and movies typically follow a static-camera pan-static sequence. Thus, the occurring frequency of motion variation patterns is a good indicator of the visual content complexity of a video sequence.

The triangle model generator 140 segments the video sequence into sub-segments of consecutive motion variation patterns as computed by the motion analysis module 130. These sub-segments usually contain one or more patterns of motion acceleration followed by motion deceleration. In one embodiment, the sub-segments are triangles. The triangle model generator 140 uses rules of triangle construction (not shown) to generate suitable triangles for the motion variation patterns. As discussed below, these rules take into account the size of the triangle and the slopes of some of the triangle's sides.

The key frame selection module 150 selects one or more key frames based on the triangle model generated by the triangle model generator 140. The key frame selection module determines the number and location of key frames based on selection rules. These selection rules instruct the key frame selection module 150 which frames from the video sequence that lie within the triangle model should be selected as key frames. In addition, because the triangle model is a measure of the visual content complexity of the video sequence, the selection rules also determine the number of key frames selected. For example, a video sequence having high visual content complexity (such as, for example, a basketball highlights video) generally will have more key frames than a video sequence having low visual content complexity (such as, for example, a talk show video).

II. Exemplary Operating Environment

The key frame extraction system 100 is designed to operate in a computing environment. The following discussion is intended to provide a brief, general description of a suitable computing environment in which the invention may be implemented.

Figure 2:
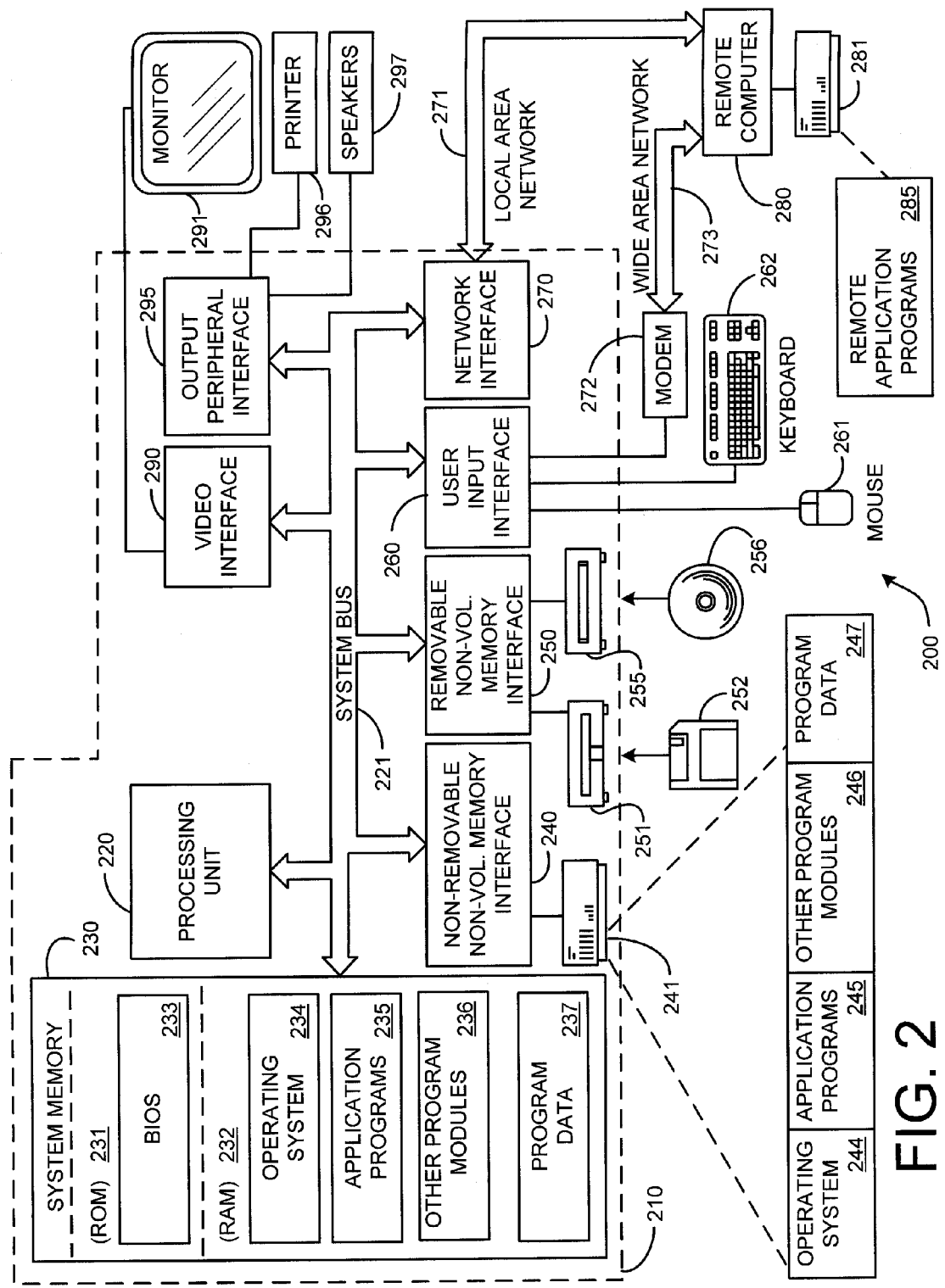
FIG. 2 illustrates an example of a suitable computing system environment on which the key frame extraction system and method shown in FIG. 1 may be implemented.

FIG. 2 illustrates an example of a suitable computing system environment 200 on which the key frame extraction system 100 and method may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the invention includes a general-purpose computing device in the form of a computer 210.

Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

III. System Components

As described in general above, the key frame extraction system 100 includes a number of components. In combination, these components allow the system 100 to process a video sequence and extract representative key frames of the video. In general, the components of the system 100 include a motion analysis module 130, a triangle model generator 140, and a key frame selection module 150. Each of these components will now be discussed in detail.

Figure 3:
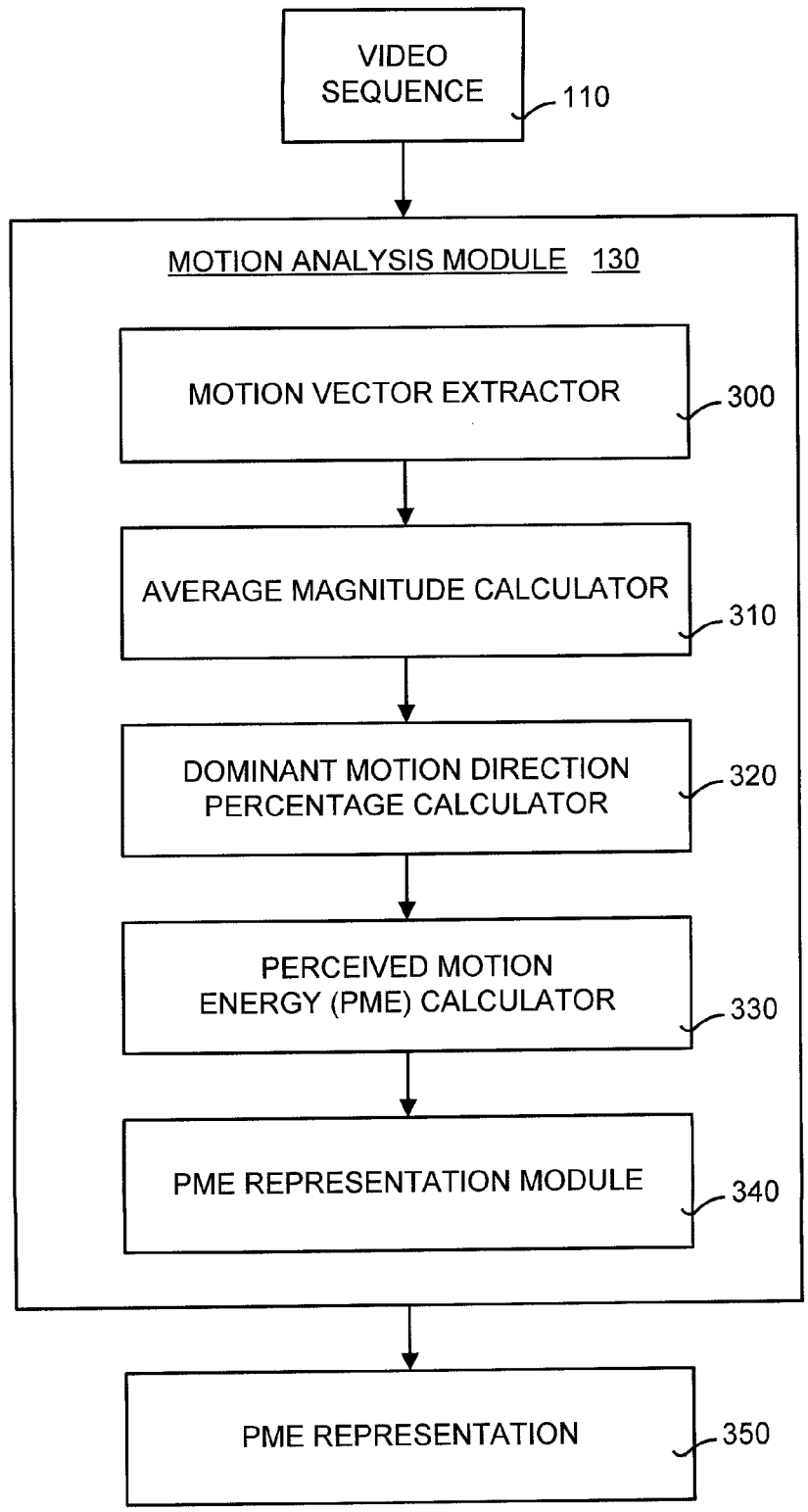
FIG. 3 is a block diagram illustrating the details of an exemplary implementation of the motion analysis module shown in FIG. 1.

The first module of the key frame extraction system 100 is the motion analysis module 130. The motion analysis module 130 computes energy of motion or motion variation patterns of each frame of the video sequence 110. In a preferred embodiment, the motion analysis module 130 computes a perceived motion energy (PME) model from the video sequence 110. FIG. 3 is a block diagram illustrating the details of an exemplary implementation of the motion analysis module 130 shown in FIG. 1. In particular, the video sequence 110 is received by the motion analysis module 130 for processing. The video sequence 110 is a digital collection of video frames. This video sequence 110 may be obtained from a digital camera, from an analog camera (and converted into digital form), or from a video stream.

Referring to FIG. 3, the motion analysis module 130 includes a motion vector extractor 300 that extracts motion vectors from each frame of the video sequence 110. These motion vectors reflect the magnitude and direction of the motion of the macro blocks of the frame at a particular point in the sequence. The motion vectors then are sent to an average magnitude calculator 310. The average magnitude calculator 310 computes the average magnitude of motion vectors within a frame of the video sequence 110. Next, a dominant motion direction percentage calculator 320 computes the spatial motion consistency of a frame. This is achieved by determining a percentage of dominant motion direction for the frame. The dominant motion direction is the direction a majority of motion vectors is oriented.

A perceived motion energy calculator 330 computes the perceived motion energy (PME) of the video sequence 110. This computation is performed using the average magnitude of motion vectors from the average magnitude calculator 310 and the percentage of dominant motion direction from the dominant motion direction percentage calculator 320. The PME representation module 340 combines each PME values for each frame from the PME calculator 330 to obtain a PME representation 350 of the video sequence 110. The PME representation 350 then is sent as output from the PME representation module 340.

The next module in the key frame extraction system 100 is the triangle module generator 140. This module 140 divides the PME representation 350 of the video sequence 110 into a series of triangles. In other words, the triangle module generator 140 is used to detect patterns of triangles in the PME representation 350 of the video sequence 110. These triangles represent one or more motion variation patterns of motion acceleration followed by motion deceleration. In addition, the area of each triangle represents the accumulated perceived motion energy with the motion variation pattern.

Figure 4:
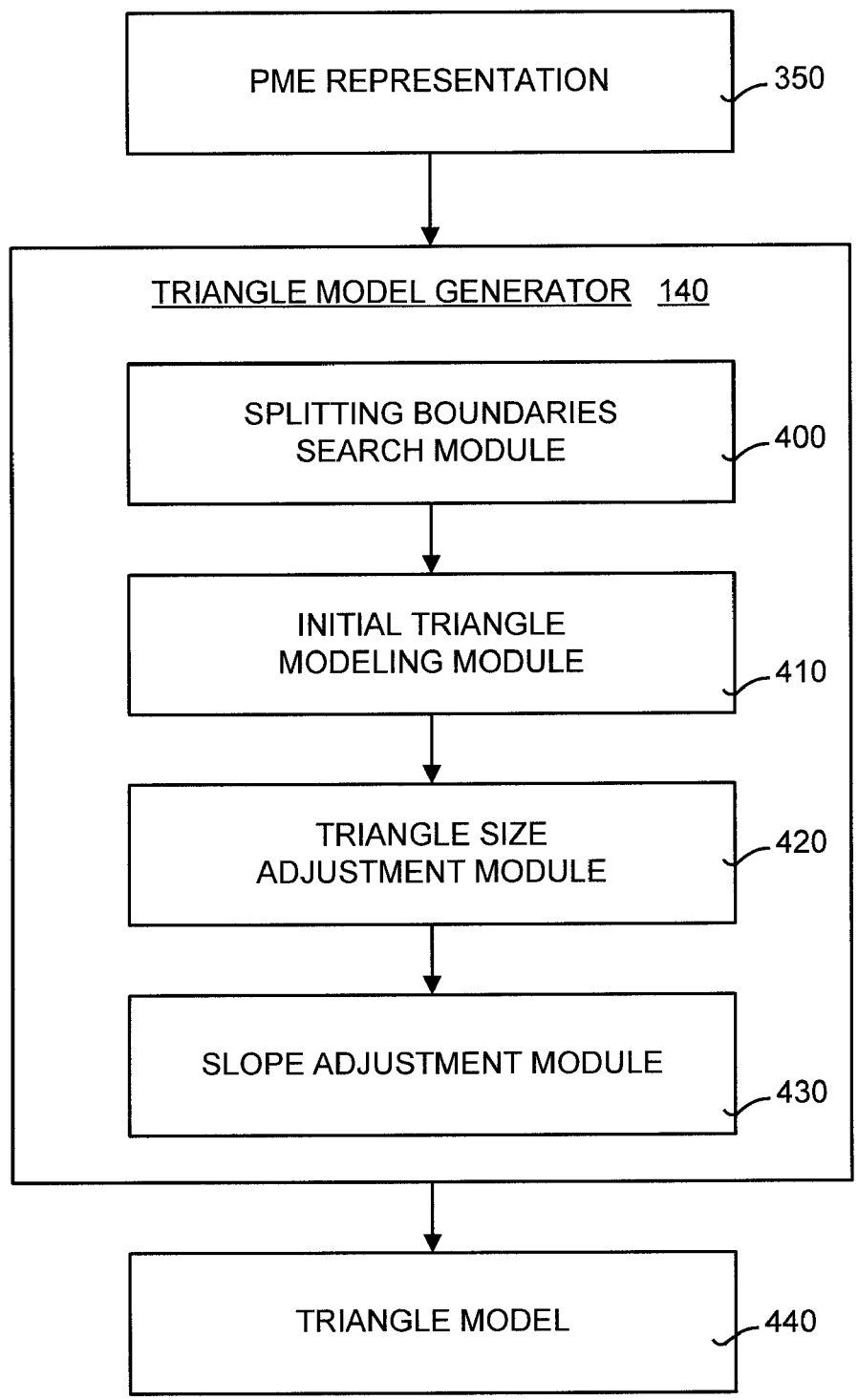
FIG. 4 is a block diagram illustrating the details of an exemplary implementation of the triangle model generator shown in FIG. 1.

FIG. 4 is a block diagram illustrating the details of an exemplary implementation of the triangle model generator 140 shown in FIG. 1. In particular, the PME representation 350 is received by the triangle model generator 140 and sent to a splitting boundaries search module 400 for processing. The splitting boundaries search module 400 searches the PME representation 350 for splitting boundaries. Splitting boundaries are location in the PME representation 350 where a long, continuous motion pattern can be divided into multiple segments. Splitting in necessary because when motion continues for long period of time the triangle becomes less accurate. In one embodiment, the splitting boundaries correspond to local minimums in the PME representation 350. It should be noted that splitting boundaries may not always be found or needed. For example, if the PME representation 350 lacks long continuous motion segments then splitting boundaries are not needed.

Once the splitting boundaries (if needed) have been found, an initial triangle modeling module 410 performs a search to find triangle patterns in the PME representation 350. In a preferred embodiment, triangle patterns are found by searching for location where the PME value is approximately zero. The zero points indicate the start and stop locations of a triangle. Based on the splitting boundaries and start and stop location, the initial triangle modeling module 410 then applies a pattern of triangles to the PME representation 350.

In order to increase the accuracy of the triangle model, a series of rules of triangle construction may be applied to the pattern of triangles. In a preferred embodiment, the rules take into account the size of the triangle and the slopes of some of the sides of the triangle. The rules are implemented in a triangle size adjustment module 420 and a slope adjustment module 430.

The triangle patterns generated by the initial triangle modeling module 410 are sent to the triangle size adjustment module 420. The triangle size adjustment module 420 examines the triangle patterns to ensure that a triangle is of a minimum size. Having a minimum size alleviates a pattern of small triangles that leads to a surplus of key frames. In addition, the triangle size adjustment module 420 checks to see if the triangles are too large. If the triangle is too large, then a key frame representing important content could be missed. Based on these two size constraints, the triangle size adjustment module 420 reconfigures each triangle that does not meet these constraints. Splitting of a triangle that is too large is performed at the splitting boundaries generated by the splitting boundaries search module 400. Triangles that are too small are joined together and the newly-created triangle is processed by the triangle size adjustment module 420. In this manner, the triangle size adjustment module 420 generates ensures that triangles are within a certain size boundaries. It should be noted that these size constraints can be selected by a user or determined by the system 100 based on prior experience.

The triangle patterns generated by the initial triangle modeling module 410 are also examined by a slope adjustment module 430. The slope adjustment module 430 examines each two sides of each triangle to ensure that the slope of each side is not too small. In general, too small of a slope means that the triangle needs to be split into smaller triangles. In addition, the slope adjustment module 430 looks for adjacent triangle sides that have similar slopes. In this situation, the two triangles with similar slopes can be merged into a single triangle. The triangle size and slope constraints represent the rules of triangle construction that are applied to each triangle generated by the initial triangle modeling module 410. The result of processing by the triangle model generator 140 is a triangle model 440 applied to the PME representation 350.

Figure 5:
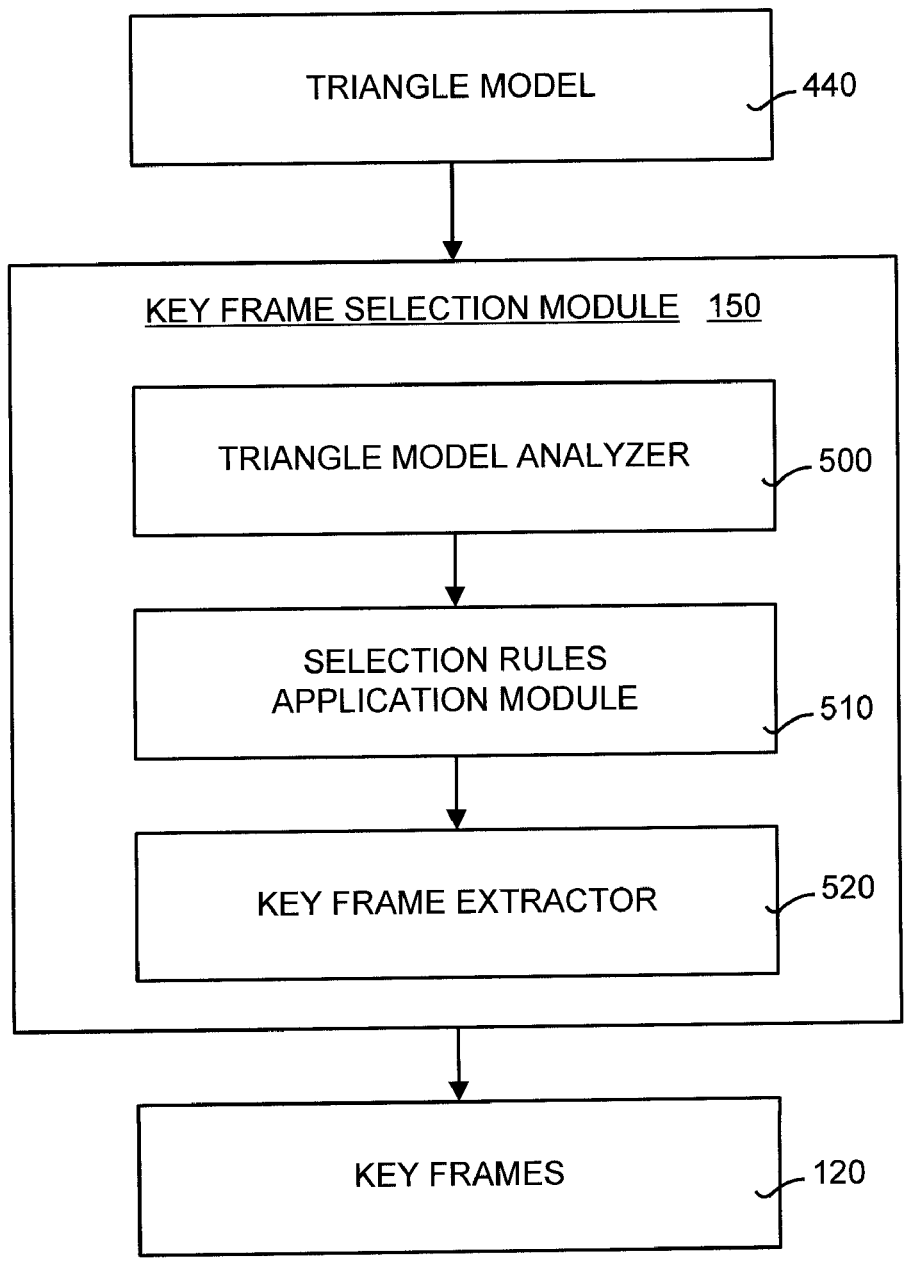
FIG. 5 is a block diagram illustrating the details of an exemplary implementation of the key frame selection module shown in FIG. 1.

Another module in the key frame extraction system 100 is the key frame selection module 150. This module 150 selects one or more key frames from the triangle model based on selection rules. These selection rules determine where on each triangle a key frame should be chosen and the number of key frames to choose. FIG. 5 is a block diagram illustrating the details of an exemplary implementation of the key frame selection module 150 shown in FIG. 1. In particular, the triangle model 440 is processed by a triangle model analyzer 500 that notes the location of each triangle within the model 440. Next, a selection rules application module 510 applies a set of selection rules to the triangle model 440. These selection rules include where on the triangle to choose a key frame and the number of key frames to select. The selection rules can be determined by a user, randomly or empirically by the system, or any combination thereof. Once the selection rules have been applied by the selection rules application module 510, a key frame extractor 520 extracts each key frame from the video sequence 110 based on the selection rules as applied by the selection rules application module 510. The key frames 120 are then output from the key frame selection module 150.

IV. Operational Overview

The key frame extraction method of the invention uses the key frame extraction system described above to select and extract key frames from a video sequence. The selection of key frames is based on an examination of motion variation within each video frame. Motion analysis is performed on each video frame to pinpoint motion variation patterns that include motion acceleration and deceleration points within the frame. Based on these motion variation patterns, a triangle model of motion is applied to the motion analysis representation. Based on selection rules, frames from the triangle model are extracted to serve as key frames. These key frames correspond to frames that a user would most probably like to see in an edited version of the video. The key frame selection process is threshold free, fast, and provides key frames that best represent the content of the video.

Figure 6:
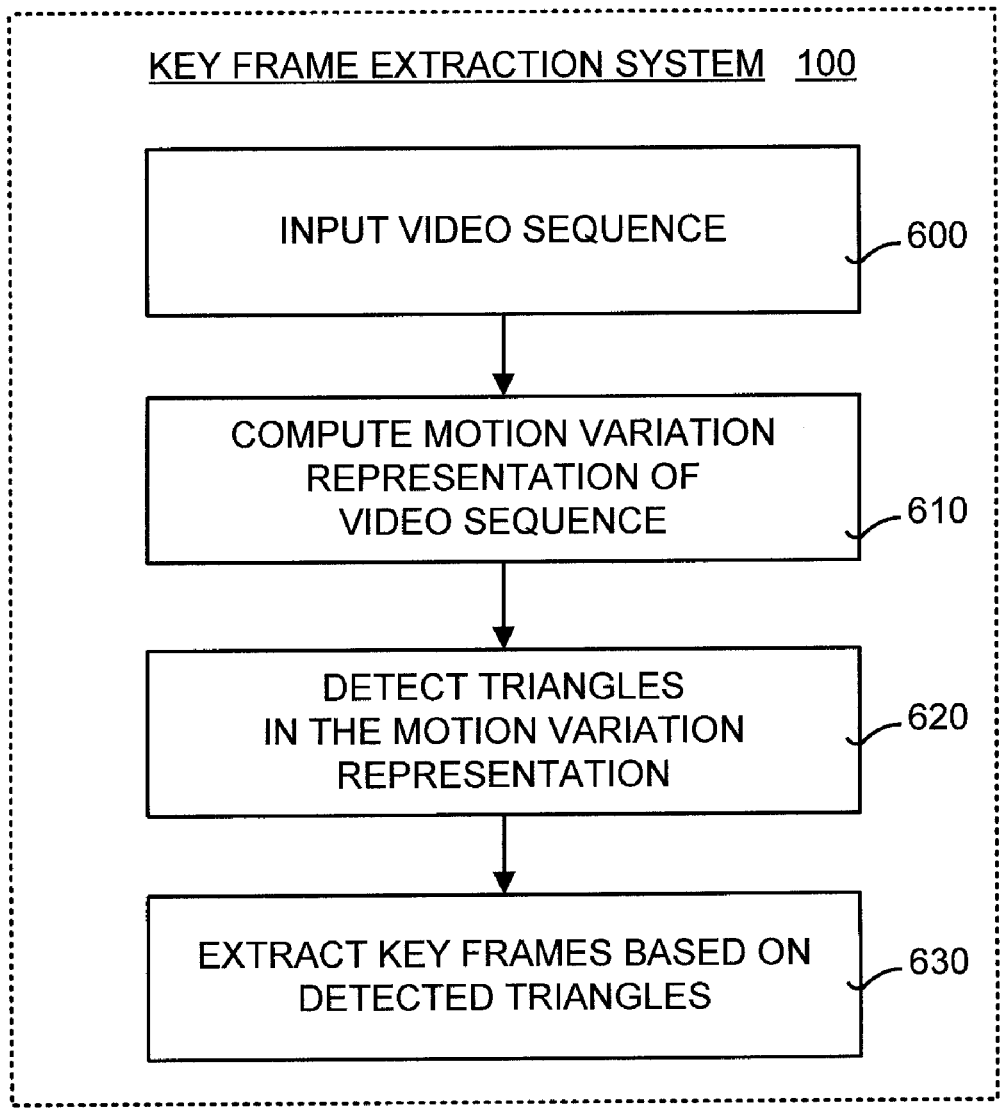
FIG. 6 is a general flow diagram illustrating the operation of the key frame extraction method.

FIG. 6 is a general flow diagram illustrating the operation of the key frame extraction method. The method begins by receiving a video sequence as input (box 600). The video sequence contains a plurality of video frames and is in a digital format. Next, a representation of variation of motion of the video sequence is computed (box 610). This representation captures the variations of motion than occur over the video sequence. The pattern of motion variations is usually an acceleration followed by a deceleration.

In a preferred embodiment, the motion variation representation is a perceived motion energy (PME) representation. In general, the PME model is a combined metric of motion intensity and motion characteristics with an emphasis on dominant motion. More specifically, PME measures user-perceived motion. There are several ways that motion can be described, such as panning, zooming, and objects moving across the screen. It can be quite difficult, however, to describe and model each of these motions. A more qualitative way to describe motion is the PME approach, which alleviates the need for detailed descriptions of motion. The PME approach describes the motion that a user perceives. The PME value is an "energy" value that describes motion that is observed in each video frame. A higher PME value means that the frame contains a high amount of energy, while a lower PME value indicates that the frame contains a low amount energy. As used in the context of the PME approach, energy can reflect not only the velocity but also the mass perceived by a user. For example, higher energy in a frame can be attributed to both faster motion and the movement of larger or numerous objects in the frame. On the other hand, lower energy in a frame can be caused by both slower motion and a smaller or single object in motion in the frame.

Next, the motion variation representation of the video sequence is segmented and triangles are detected (box 620). In other words, patterns of triangles are detected in the motion variation representation. These triangles can be adjusted based on their size and the slope of their sides. This adjustment is performed in accordance with rules of triangle construction. Once the triangles have been detected, the key frames are extracted based on the detected triangles (box 630).

V. Operational Details and Working Example

In order to more fully understand the key frame extraction method disclosed herein, the operational details of an exemplary working example are presented. It should be noted that this working example is only one way in which the key frame extraction method may be implemented.

Perceived Motion Energy

In order to extract key frames based on motion patterns, a motion model is needed that reflects the motion activities in video sequences, thereby guiding the selection of key frames. In this working example, the motion model used was a perceived motion energy (PME) model. The PME model is a combined metric of motion intensity and motion characteristics with more emphasis on dominant motion.

The motion analysis process is simplified by choosing to extract motion data to build the perceived motion energy model directly from MPEG video streams or compressed video sequences. In a MPEG stream, there are two motion vectors in each macro block of B-frame for motion compensation. These motion vectors are often referred to as a motion vector field (MVF). Since the magnitude of a motion vector reflects the motion velocity of a macro block, the magnitude was used to compute the energy of motion of each frame in the video sequence. Although the angle of a motion vector is not a reliable representation of motion direction of a macro block, the spatial consistency of angles of motion vectors does reflect the intensity of global motion. Spatial motion consistency was obtained by calculating the percentage of dominant motion direction in an entire frame. The more consistent the angles, the higher the intensity of global motion.

The average magnitude Mag(t) of motion vectors in the entire frame was calculated as:

$$\mathrm{Mag}(t) = (\Sigma \mathrm{MixFEn}_{i,j}(t)/N + \Sigma \mathrm{MixBEn}_{i,j}(t)/N)/2 \quad (1)$$

where $\mathrm{MixFEn}_{i,j}(t)$ represents forward motion vectors and $\mathrm{MixB\,En}_{i,j}(t)$ represents backward motion vectors. N is the number of macro blocks in the frame.

The percentage of dominant motion direction α(t) was defined as:

$$\alpha(t) = \frac{\max(AH(t, k), k \in [1, n])}{\sum_{k=1}^{n} AH(t, k)} \quad (2)$$

The angle in 2π was quantized into n angle ranges. Then number of angles in each range was accumulated over the whole forward motion vectors to form an angle histogram with n bins, denoted by AH(t,k), k E[1,n]. This means that max(AH(t,k)) was the dominant direction bin among all motion directions. n was set to value of 16 in this working example.

The perceived motion energy (PME) of a B frame was computed as follows:

$$PME(t) = \mathrm{Mag}(t) \times \alpha(t) \quad (3)$$

The term, α(t), represents the percentage of dominant motion direction. From Equation (3), it can be seen that PME is a combined metric of motion intensity and the kind of motion with more emphasis on dominant video motion. This means that the accumulated perceived motion energy within a triangle or sub-segment of the PME representation reflects its relative salience of visual action content.

The average forward and backward motion vectors of each B frame in Equation (1), namely, $MixFEn_{i,j}(t)$ and $MixBEn_{i,j}(t)$, were computed after a spatial filtering process was applied to the original MVF of a frame. This is filtering process was used because there are several noises and atypical vectors in a MVF due to the blocking matching process. These noises in the MVF usually result in inaccurate energy accumulation. The spatial filter that was used in this working example was a modified median filter. The elements in the filter's window at macro block $MB_{i,j}$ (either forward or backward) are denoted by $\Omega_{i,j}$ in MVF, where $W_s$ is the width of window. The filtered magnitude of motion vector was computed by:

$$Mag_{(i,j)} = \begin{cases} Mag_{i,j} & \text{if } Mag_{i,j} \leq \text{Max 4th}(Mag_k) \\ \text{Max 4th}(Mag_{i,j}) & \text{if } Mag_{i,j} > \text{Max 4th}(Mag_k) \end{cases} \quad (4)$$

where $k \in \Omega_{i,j}$, and the function $\text{Max4th}(Mag_k)$ return the fourth value in the descending sorted list of magnitude elements $\Omega_{i,j}$ in the filter window.

Next, the spatial filtered magnitudes at each macro block position (i,j) were averaged with a second filter. The second filter adopted an alpha-trimmed filter within a window, with a spatial size of $W_t^2$. All of the magnitudes in the window were sorted first. After the values at two ends of the sorted list were trimmed, the rest of magnitudes were averaged to form a mixture energy $MixEn_{i,j}$. This mixture energy includes the energy of both object and camera motion, and is represented as:

$$MixEn_{i,j} = \frac{1}{(M - 2 \times \lfloor \alpha M \rfloor) \times W_t^2} \sum_{m=\lfloor \alpha M \rfloor + 1}^{M - \lfloor \alpha M \rfloor} Mag_{i,j}(m) \quad (5)$$

where M is the total number of magnitudes in the window, and $\lfloor \alpha M \rfloor$ equals to the largest integer not greater than $\alpha M$, and $Mag_{i,j}(m)$ is the magnitudes value in the sorted list. The trimming parameter $\alpha(0 \leq \alpha \leq 0.5)$ controls the number of data samples excluded from the accumulating computation.

Triangle Model

As discussed above, a PME value was calculated for each B frame. Once the PME value for each frame was calculated, the video sequence was represented by a PME value sequence (or PME representation of the video sequence), PME(t) Before temporally segmenting the PME sequence, however, into a plurality of sub-segments, the PME sequence, PME(t), was filtered by averaging PME values within a window of 5 to smooth out potential noises in the PME sequence. Next, the pattern of a motion acceleration process and a following deceleration process was modeled by triangles.

Figure 7:
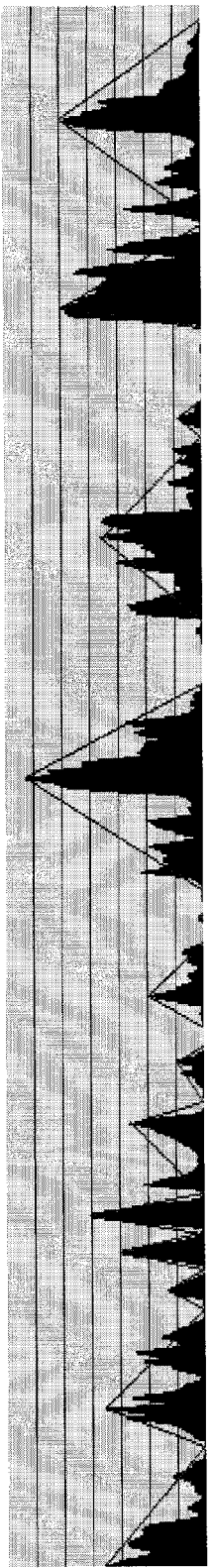
FIG. 7 illustrates a sequence of motion triangles used in the working example.

A triangle model was used to segment video sequence into successive segments and represent each of the segments. FIG. 7 illustrates an example of a sequence of motion triangles. Referring to FIG. 7, the left bottom vertex of a triangle represents a start point of a segment and its PME value is zero. The right bottom vertex of the triangle represents an end point of the segment and its PME value is also zero. The top vertex of the triangle represents the maximum PME value of the segment. Mathematically, for segment i, the triangle model is represented by $(ts_i, te_i, tp_i, PME_i, AP_i)$, where $ts_i$ is the start point, $te_i$ is the end point, $tp_i$ is the point of peak motion, $PME_i$ is the peak PME value of the segment, and $AP_i$ is the accumulated perceived motion energy obtained by summing up all PME values within the sub-segment. It should be noted that $PME(ts_i) = PME(te_i) = 0$. A special triangle model $(ts_i, te_i, tp_i, 0, 0)$ was used for successive zeros.

Figure 8B:
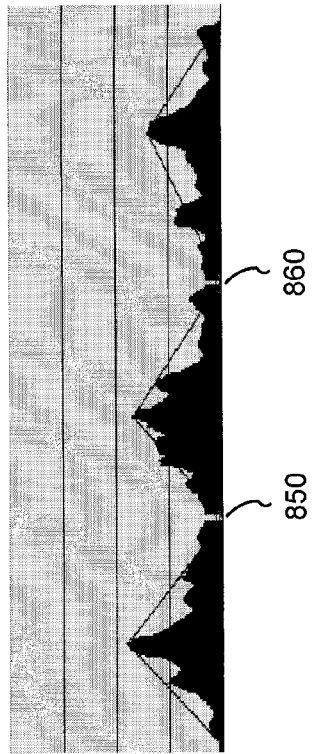
FIG. 8B illustrates the results of splitting the triangle shown in FIG. 8A.
Figure 8A:
FIG. 8A illustrates a triangle used in the working example that is too large prior to splitting.

The video sequence was segmented by detecting triangle patterns in the PME sequence. The PME value of a start point and of an end point of a segment are both zero. Thus, a simple search process was used to find the triangle patterns. When the motion continues for a long time, however, the triangle will become less accurate. FIG. 8A illustrates a triangle that is too large prior to splitting. In this case, a splitting process was performed before the triangle pattern search process. In order to split long continuous motion, splitting boundaries were determined. For a particular point (t,PME(t)), if $$PME(t) = \min(PME(t-T), \ldots, PME(t-i), \ldots, PME(t+i), \ldots, PME(t+T)))$$

and $$PME(t+j) > 0, j \in [-T, T]$$

then PME(t) is set 0. This means that (t,PME(t)) became a splitting boundary. In addition, the other local minimums of the PME sequence were set as splitting boundaries. FIG. 8B illustrates the results of splitting the triangle shown in FIG. 8A. Referring to FIG. 8B, note that two blocks 850, 860, show the location of the two splitting boundaries. The splitting boundaries are local minimums of the PME sequence. As a result, the large triangle in FIG. 8A was split into three small triangles, as shown in FIG. 8B. It should be noted that T is the window size and, in this working example, was set to a value of 100.

Figure 9A:
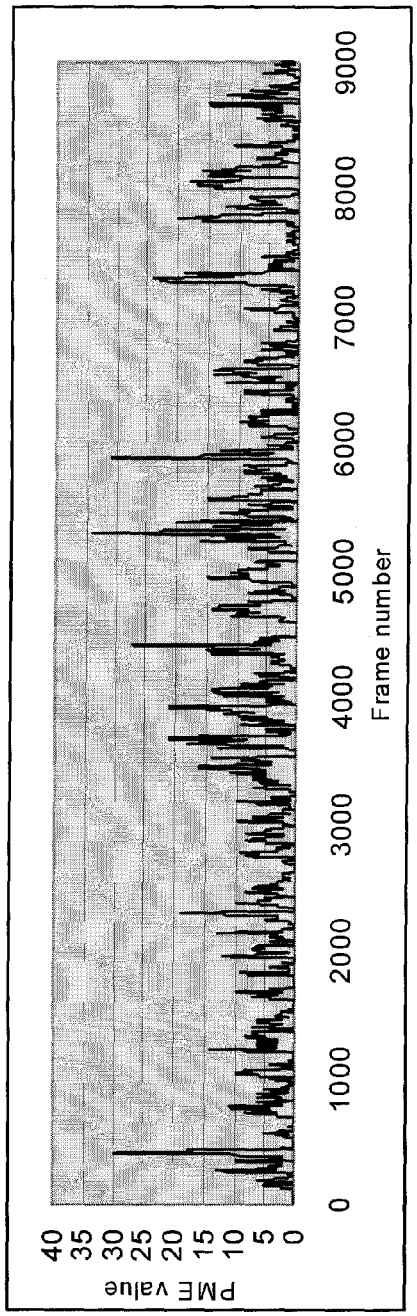
FIGS. 9A and 9B illustrate the PME sequences of a basketball video used in the working example.
Figure 9B:
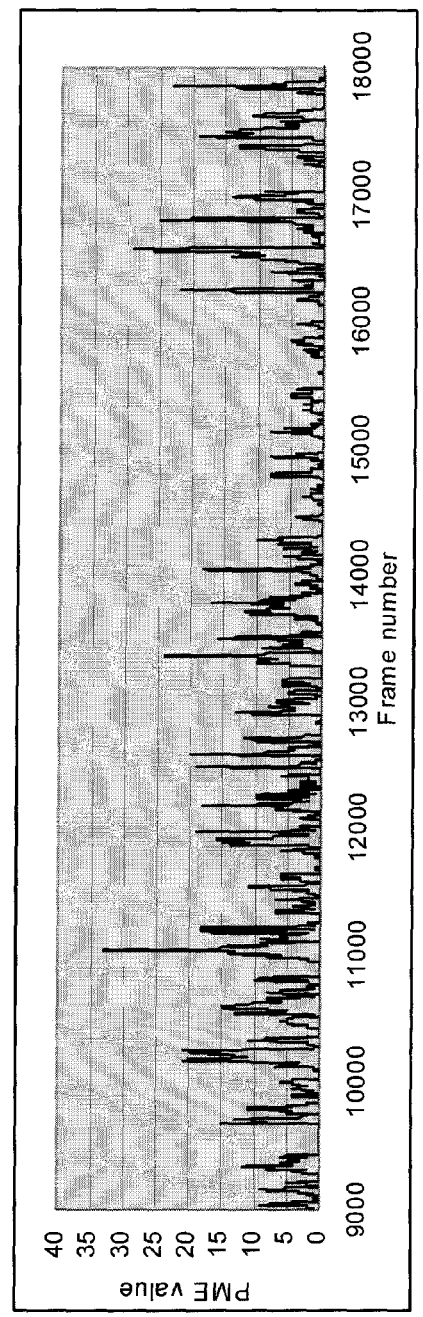
Figure 10A:
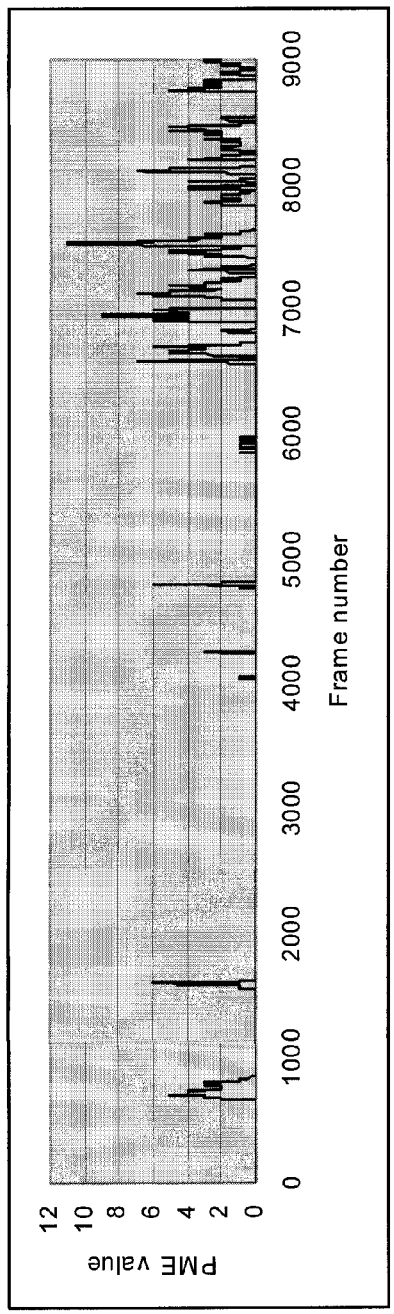
FIGS. 10A and 10B illustrate the PME sequences of a soccer video used in the working example.
Figure 10B:
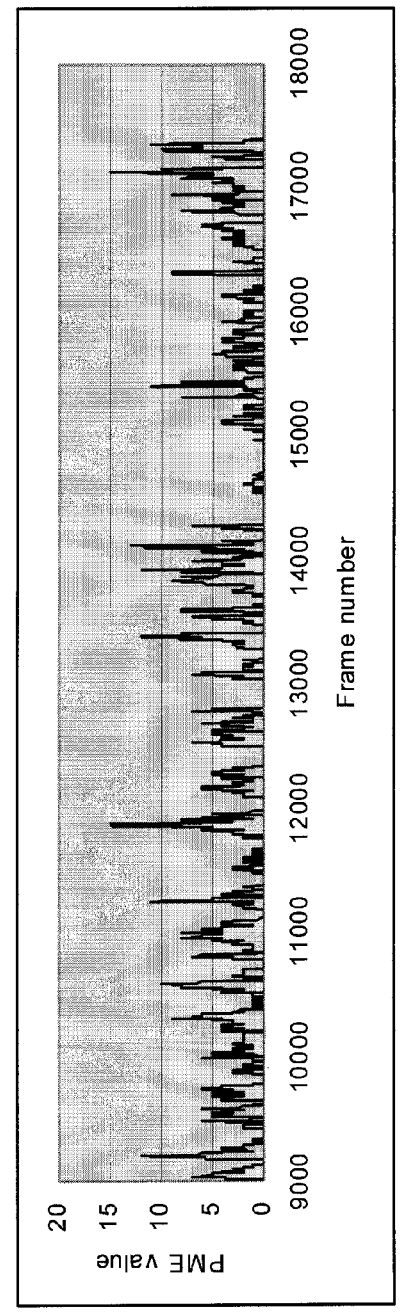

FIGS. 9A and 9B illustrate the PME sequences of a basketball video (MPEG-7 CD 26 KBS), while FIGS. 10A and 10B illustrate the PME sequences of a soccer video (MPEG-7 CD 28, Samsung). It can be seen from FIGS. 9A, 9B, 10A and 10B that the motion pattern (typically composed of an acceleration process and a deceleration process) is repeated during the whole video sequence. Using the triangle model is a simple, yet effective, way to represent such motion patterns. A motion pattern usually corresponds to an action event. Thus, the occurring frequency of action event is a good metric for measuring visual content complexity of a video sequence. In other words, an increased number of action events in a video sequence mean an increase in complexity of the video sequence. It follows that increased complexity means that more key frames are needed to represent the video sequence.

Key Frame Selection

Figure 11A:
FIGS. 11A and 11B illustrate the key frames selected by the key frame extraction method for the basketball video in the working example.
Figure 11B:
Figure 12:
FIG. 12 illustrates the key frames selected for the soccer video of the working example.

Because each motion pattern usually corresponds to an action, one key frame was extracted for each motion pattern. In addition, the turning (or inflection) point of the motion acceleration and deceleration was selected as the key frame. That is, the top vertex of the triangle was selected as the key frame. The advantages of this selection process are twofold. First, the triangle model of perceived motion energy divides the entire video sequence into meaningful action events. Each of these action events are represented by its corresponding key frame such that visual action content within video sequence is fully captured. Second, the inflection point of motion acceleration and deceleration usually represents the most salient point of an action event. This means that one can infer the movement within the acceleration process and deceleration process is given by the turning point. FIGS. 11A and 11B illustrate the key frames selected by the key frame extraction method for the basketball video. Similarly, FIG. 12 illustrates the key frames selected for the soccer video. It can be seen from FIGS. 11A, 11B and 12 that the key frames capture salient action events in the two sequences.

In one embodiment, the key frame extraction method uses one or more a standard shot detection technique to obtain a key frame. In this embodiment, standard shot detection techniques are needed because if the perceive motion energy is flat (constant) or zero, the PME triangle model of the invention has difficulty extracting key frames. In this embodiment, standard shot detection techniques are used as a back-up approach to detect key frames even when the triangle model cannot.

In general, the standard shot detection techniques are used to segment the video sequence into a series of video sequence (or shots) prior to applying the triangle model. The shot detection technique identifies the shot boundaries. These shot boundaries are used to verify the temporal segmentation of the triangles. This alleviates error due to noise (which can make a triangle where there should not be one and can make the camera cross two shots, which should not be the case). Thus, using shot boundaries verifies the accuracy of the triangle model.

In addition, as stated above, this embodiment uses static shot detection to extract key frames from the video sequence that contain little or no motion (or static shots). This allows the key frame extraction method to extract key frames from video sequences having no motion or constant motion. In other words, wherever the perceived motion energy is constant (flat) or zero. Thus, the static shot detection is a complementary way of doing key frame extraction. When there is no motion or constant motion, the key frame extraction method can still do a key frame extraction using shot detection. In general, the shot detection technique typically extracts the first frame of the video sequence as the key frame. However, other possibilities include extracting the middle frame or other frames of the video sequence as determined by the user or the shot technique used.

Figure 13A:
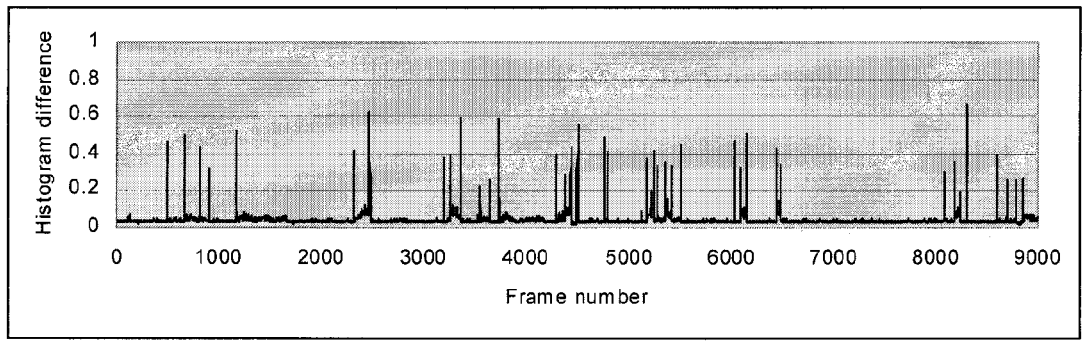
FIGS. 13A and 13B illustrate the color histogram difference of the basketball video of the working example.
Figure 13B:
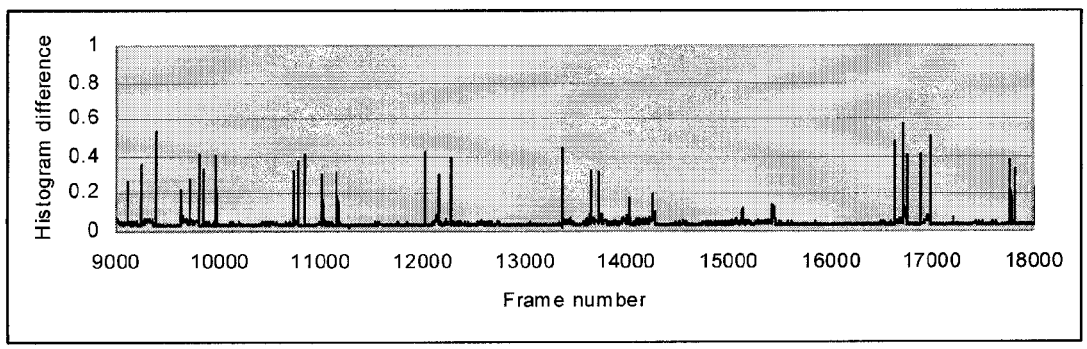
Figure 14A:
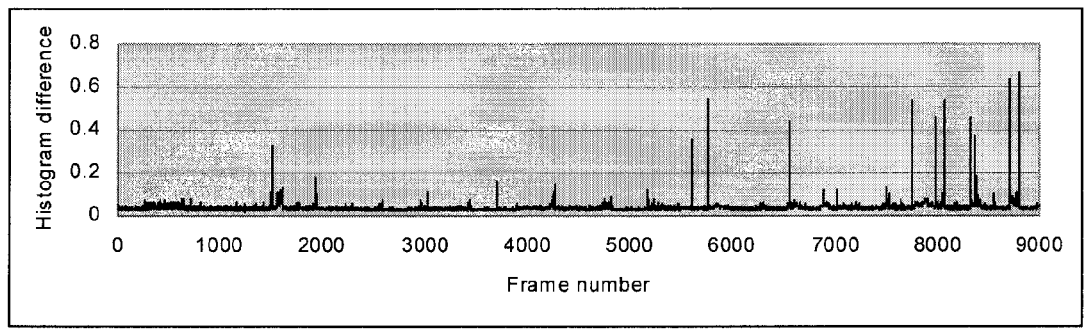
FIGS. 14A and 14B illustrate the color histogram difference of the soccer video of the working example.
Figure 14B:
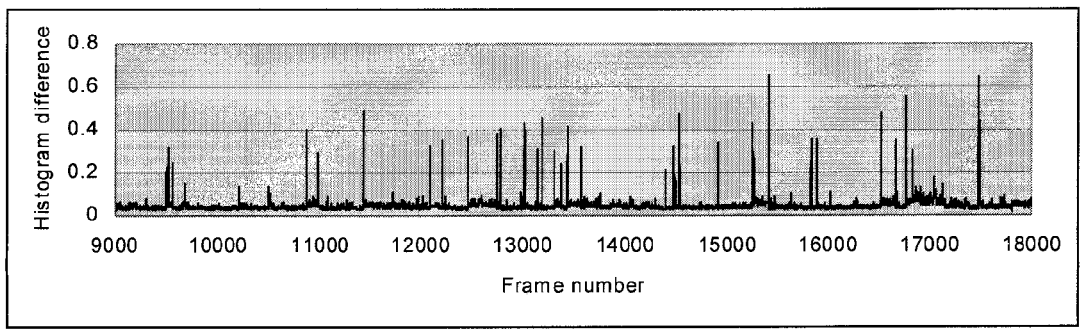
Figure 15:
FIG. 15 illustrates the key frames selected using a shot detection technique as applied to the basketball video.
Figure 16:
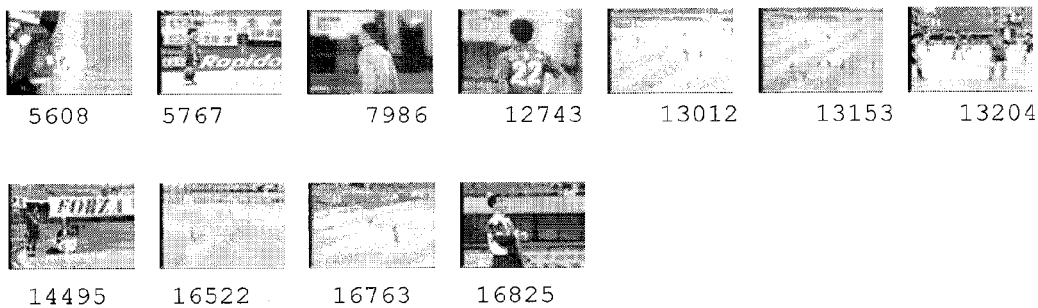
FIG. 16 illustrates the key frames selected using the shot detection technique as applied to the soccer video.

In this working example, a twin-comparison shot detection method was used. This twin-comparison method is described in detail in a paper by H. J. Zhang, A. Kankanhalli and S. W. Smoliar entitled, "Automatic Patterning of Full-motion Video", ACM Multimedia System, Vol. 1, No. 1, pp. 10-28, 1993. In order to use this twin-comparison technique, a color histogram difference was used. FIGS. 13A and 13B illustrate the color histogram difference of the basketball video. Similarly, FIGS. 14A and 14B illustrate the color histogram difference of the soccer video. For those video sequences having motion patterns, the key frames selected by the triangle model are the key frames for these video sequences. On the other hand, for those video sequences with no motion pattern, the first frame was selected as a key frame. It should be noted that the first frame is usually enough to represent a static shot. FIG. 15 illustrates the key frames selected using the shot detection technique described above as applied to the basketball video. FIG. 16 illustrates the key frames selected using the shot detection technique as applied to the soccer video.

In some situations, the number of key frames allowed for a video sequence may be regulated. In this case, each video sequences will be assigned one part of given N key frames according to the percentage share of its motion patterns in the total patterns of the sequence, denoted by $N_i$. For each video sequence, motion patterns are sorted by the accumulation of perceived motion energy and the top $N_i$ patterns are selected as key frames. If the video sequence contains no motion or constant motion, the first frame of the static video sequence is selected as the only key frame.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for processing digital video, comprising:
computing a motion variation representation of the video;
temporally segmenting the motion variation representation into sub-segments;
detecting triangles in the sub-segments of the motion variation representation; and
extracting key frames from the video based on the detected triangles, wherein extracting key frames further comprises using selection rules to extract the key frames, wherein the selection rules include selecting a key frame at an apex of each detected triangle where perceived motion energy is changing.

2. The method as set forth in claim 1, wherein the motion variation representation is a perceived motion energy representation.

3. The method as set forth in claim 2, further comprising computing the perceived motion energy representation from motion vectors in a frame of the digital video.

4. The method as set forth in claim 2, further comprising computing the perceived motion energy representation using an average magnitude of motion vectors and a percentage of dominant motion direction.

5. The method as set forth in claim 1, further comprising creating the detected triangles using rules of triangle construction.

6. The method as set forth in claim 5, wherein the rules of triangle construction include rules about triangle size and a slope of triangle sides.

7. The method as set forth in claim 1, wherein the selection rules include selecting a key frame at an apex and a vertex of each detected triangle.

8. The method as set forth in claim 1, further comprising:
computing a perceived motion energy representation of the video;
temporally segmenting the perceived motion energy representation and detecting triangles based on motion patterns within the perceived motion energy representation; and
selecting one or more key frames from the video based on the segmentation of the perceived motion energy representation.

9. The method as set forth in claim 8, further comprising detecting the motion patterns within the perceived motion energy representation.

10. The method as set forth in claim 9, wherein the motion patterns are patterns of motion acceleration followed by motion deceleration.

11. The method as set forth in claim 8, wherein segmenting the perceived motion energy representation further comprises applying a triangle model to the perceived motion energy representation based on the segmentation.

12. A key frame extraction system for selecting and extracting key frames from a video sequence, comprising:

a motion analysis module that computes motion variation patterns of the video sequence;

a triangle model generator that temporally segments the video sequence into a plurality of sub-segments based on the motion variation patterns, wherein the triangle model generator further comprises:

an initial triangle modeling module that generates initial triangle patterns based on the plurality of sub-segments;

a slope adjustment module that examines two side of each triangle in the initial triangle patterns to determine whether a triangle is within a minimum and a maximum slope; and a key frame selection module that selects one or more key frames based on the sub-segments.

13. The key frame extraction system as set forth in claim 12, wherein the motion analysis module further comprises a motion vector extractor that extracts motion vectors from a frame of the video sequence.

14. The key frame extraction system as set forth in claim 12, wherein the motion analysis module further comprises a perceived motion energy calculator that computes a perceived motion energy representation based on the motion variation patterns.

15. The key frame extraction system as set forth in claim 12, wherein the triangle model generator further comprises a triangle size adjustment module that examines the initial triangle patterns to determine whether a triangle is within a minimum and a maximum size.

* * * * *